US012667097B2

(12) United States Patent
Ehlers et al.

(10) Patent No.: US 12,667,097 B2
(45) Date of Patent: Jun. 30, 2026

(54) DEVICES AND METHOD FOR PROTECTING CROP PLANTS AND/OR SOWN SEEDS AGAINST UNWANTED PLANTS

(71) Applicants: Robert Ehlers, Kronberg (DE); Patrick Büchel, Bonn (DE)

(72) Inventors: Robert Ehlers, Kronberg (DE); Patrick Büchel, Bonn (DE)

( * ) Notice: Subject to any disclaimer, the term of this patent is extended or adjusted under 35 U.S.C. 154(b) by 915 days.

(21) Appl. No.: 16/955,832

(22) PCT Filed: Dec. 19, 2018

(86) PCT No.: PCT/EP2018/085996
§ 371 (c)(1),
(2) Date: Jun. 19, 2020

(87) PCT Pub. No.: WO2019/122020
PCT Pub. Date: Jun. 27, 2019

(65) Prior Publication Data
US 2021/0007291 A1     Jan. 14, 2021

Related U.S. Application Data

(60) Provisional application No. 62/610,122, filed on Dec. 22, 2017.

(30) Foreign Application Priority Data

Dec. 22, 2017   (DE) ..................... 10 2017 131 112.2
Dec. 22, 2017   (DE) ..................... 20 2017 107 894.9

(51) Int. Cl.
A01M 21/02          (2006.01)
(52) U.S. Cl.
CPC .................................. A01M 21/02 (2013.01)

(58) Field of Classification Search
CPC ........ A01M 21/02; A01C 1/042; A01C 7/048; A01C 21/00; A01C 23/027
See application file for complete search history.

(56) References Cited

U.S. PATENT DOCUMENTS 5,442,552 A      8/1995  Slaughter et al.
6,679,338 B1 *   1/2004  Tucker ................. A01B 69/026
                                                        180/401
(Continued)

FOREIGN PATENT DOCUMENTS

CN      206118627 U     4/2017
DE      2122318 A1     11/1972
(Continued)

OTHER PUBLICATIONS

PCT/EP2018/085996; PCT International Search Report and Written Opinion of the International Searching Authority dated Mar. 19, 2019.
(Continued)

*Primary Examiner* — Marisa V Conlon
*Assistant Examiner* — Hae Rie Jessica Byun
(74) *Attorney, Agent, or Firm* — Renner, Otto, Boisselle & Sklar, LLP

(57)                ABSTRACT

A device for protecting crop plants (P) and/or sown seeds (S) against unwanted plants is provided to avoid the use of chemical weed control agents or herbicides. The device includes a ribbon or lace-shaped structure on which a plurality of annular elements are arranged at a distance from one another, in which the structure is designed to be applied to a cultivated surface (F) such that each element encloses the location (O) of a crop plant (P) or sown seed (S), and wherein each element includes a detectable means for marking the location concerned (O1, O2, . . . On) for detection by a machine for controlling mechanical weed control mechanisms. The device is thus an auxiliary or marking means (Continued)

which can be easily applied on the cultivated surface along the row of plants or seeds and allows reliable detection by machine of the locations of plants or seeds, zones to be protected.

11 Claims, 8 Drawing Sheets

(56) References Cited

U.S. PATENT DOCUMENTS

| | | | | |
|---|---|---|---|---|
| 9,313,944 | B1 * | 4/2016 | Faivre | A01M 21/02 |
| 9,532,508 | B1 * | 1/2017 | Stubbs | H04N 7/183 |
| 9,629,313 | B1 * | 4/2017 | Grossman | A01G 27/00 |
| 2015/0027044 | A1 * | 1/2015 | Redden | A01M 21/043 |
| | | | | 47/58.1 R |
| 2016/0029613 | A1 * | 2/2016 | Hyde | G05D 1/0094 |
| | | | | 700/302 |
| 2017/0223910 | A1 * | 8/2017 | Grossman | A01M 7/006 |
| 2017/0238460 | A1 * | 8/2017 | MacKean | G05D 1/0246 |

FOREIGN PATENT DOCUMENTS

| | | | | |
|---|---|---|---|---|
| DE | 4234432 | A1 | 4/1994 | |
| DE | 41234432 | A1 | 4/1994 | |
| EA | 007584 | B1 * | 12/2006 | |
| WO | 0077344 | A1 | 12/2000 | |
| WO | WO-2009067754 | A1 * | 6/2009 | A01B 69/008 |

OTHER PUBLICATIONS

Office Action for corresponding Chinese Application No. 201880082796.6 dated Nov. 22, 2022 and its English Translation.

* cited by examiner

100

DEVICES AND METHOD FOR PROTECTING CROP PLANTS AND/OR SOWN SEEDS AGAINST UNWANTED PLANTS

The present application is a U.S. National Stage Application based on and claiming benefit and priority under 35 U.S.C. § 371 of International Application No. PCT/EP2018/085996, filed 19 Dec. 2018, which in turn claims benefit of and priority to German Application No. 10 2017 131 112.2 filed 22 Dec. 2017, and German Application No. 20 2017 107 894.9 filed 22 Dec. 2017, and U.S. Application No. 62/610,122 filed 22 Dec. 2017, the entirety of all which are hereby incorporated herein by reference.

TECHNICAL FIELD

The invention relates to a device for the protection of crop plants and/or sown seeds against unwanted plants according to the preamble claim 1 as well as to methods executable therewith and to an apparatus and a machine according to the preamble of the respective claim.

BACKGROUND

In the field of agriculture it is a fundamental problem to protect the planted crops and/or sown seeds against the undesired growth of unwanted plants, commonly also referred to as weeds. Although the use of chemical weed control agents or herbicides is widespread, they have a detrimental effect on the environment. For this reason, there is growing interest in agriculture worldwide to reduce the amount of herbicides used.

Even if a purely mechanical weed control can be carried out without the use of herbicides, the known manual methods are very laborious. In this respect, methods and devices are known which enable automatic mechanical control of weeds, for example from U.S. Pat. No. 5,442,552 A disclosing a machine as a robotic cultivator. However, the machine disclosed there requires an elaborate digital video recording and evaluation system which can distinguish the useful plants from the weeds to be removed. Even if the video evaluation should work very precisely, it cannot be guaranteed that useful plants are inadvertently removed. If necessary, the operator of the machine has to take corrective action (manual intervention).

The DE 42 34 432 A1 discloses a device as well as a method for controlling the hoeing tools of an agricultural hoeing machine during the hoeing of weeds. For this purpose, the device has a strip-shaped structure ("supply strip 11") which consists of decomposable material and on which a large number of annular, detectable elements ("detectable bodies" or "wire body 4") is attached to the structure at a distance from one another, wherein the individual elements ("wire body 4") are punched out of the strip-shaped structure ("supply strip 11") and are then introduced into the soil of an agricultural area in such a way that the elements are located at a distance from one another between two planting rows (see rows with "plants 2" in FIG. 2 and text, column 4, lines 9-32), for example in the lane or rut ("5" in FIG. 2) of a seed drill or planting machine. The elements are preferably designed as detectable wire bodies in the form of metal rings and are sensor-scanned by the hoeing machine during the hoeing process to ensure that the crop plants are not damaged. The hoeing machine follows the track determined by the detectable bodies (see FIG. 2) and is set to the planting distance (distance "B" between the plants) by means of test hoeing (see text, column 4, lines 51 ff.). The distance between the detectable bodies (distance "C" in FIG. 2) is considerably larger than the planting distance (distance "B"). As a result, considerably fewer detectable bodies are introduced into the soil than plants per row. Also, not every row of plants is accompanied by a line of detectable bodies. Although this reduces the effort involved, it also reduces the accuracy of detection; in particular, the individual plant locations cannot be detected, which in turn makes effective processing of weed control more difficult. Furthermore, the isolated applied detectable wire bodies remain in the soil and only the packing material (paper layers "6 and 7") in which the wire bodies were embedded rots (see text, column 3, lines 40-61).

U.S. Pat. No. 9,313,944 B1 relates to the agricultural management of a cultivated area and discloses a control system for an agricultural apparatus recognizing detectable elements ("detectable elements" 34, which are e.g. provided with "RFID tags 50") which are distributed between the sown seed or the seeds of a seed tape (see FIG. 1A and 1B). The control system can thus determine a weed zone and/or a plant zone and can control a soil working machine for semi or fully automatic soil tillage, e.g. for weeding (see text, column 2. lines 10-20). The detectable elements ("34") are placed between each two plants or seeds at a distance which may be greater than the planting distance (see FIG. 1B). Although this saves effort, it also reduces the accuracy of the detection; in particular, the individual planting locations cannot be detected exactly, which in turn makes effective weed control more difficult.

SUMMARY

The object of the invention is to provide a device which enables a reliable mechanical weed control using autonomously operating apparatuses and machines, whereby the device should be environmentally friendly and sustainable.

The object is solved by a device with the features of claim 1.

Accordingly, there is disclosed a device for protecting of crop plants and/or sown seeds against unwanted plant, the device comprising the following features:

a reusable, ribbon or rope-shaped structure on which a plurality of annular elements are mounted spaced apart from one another, wherein the structure is designed to be applied to a cultivated surface so that each element encloses the location of a useful plant, crop or its sown seed, and wherein each element has a detectable means for marking the respective location for detection by machine for managing or operating mechanical weed control. Preferably the detectable means comprises metallic or magnetic material for inductive and/or magnetic detection.

The device thus represents an auxiliary or marking means which can be easily applied to the cultivated surface along the respective crop or seed row and enables reliable detection by machine of the respective spots of crop planting or seed sowing (protection zones). For this reason, in the following, the device is also referred to as a protection or delimitation device or briefly as a marking aid.

Preferably at least one fixing element is arranged below each of the detectable means in order to be inserted into a root ball of the respective crop plant or sown seed. By means of this, the device (marking aid) can be disposed on the cultivated surface together with the plants (seedlings) or with the seeds themselves (seeds in the root balls). This means that the device (marking aid) is always optimally positioned for each plant/seed and defines an annular protection zone within which no mechanical weed control is permitted. An elaborate optical detection and video evaluation for the reliable differentiation between crops and weeds is not necessary.

After harvesting, the device (marking aid) can be easily removed. For this purpose, the ribbon or rope-shaped structure is preferably of elastic or flexible material and is designed for being wound on a reel or spool and for being unwound from it. This allows the device (marking aid) to be stored compactly and reused several times.

In addition, a method for protecting useful/crop plants and/or seeds against unwanted weed is also proposed, wherein the device (marking aid) is used according to the invention. The method includes at least the following steps:

applying a reusable, ribbon or rope-shaped structure, to which a plurality of annular elements are attached spaced apart from one another, to a cultivated surface, each element enclosing the location of a plant or its sown seed;

detecting each element to mark the respective location for machine detection to manage or process a mechanical weed control; and mechanically removing unwanted plants/weeds from outside the marked locations of the plants or sown seed The method can advantageously be enhanced by removing the device (marking aid) from the cultivated surface after the crop has been harvested and then making it available for reuse for subsequent new planting or sowing.

Preferably, before the step of applying the ribbon or rope-shaped structure, one plant or seed is applied to one of the annular elements provided with a root ball, in particular by means of a fixing element which is arranged below the detectable means and is inserted into the root ball of the respective plant or seed.

In addition, the ribbon or rope-shaped structure is preferably applied or brought to the cultivated surface together with the applied plants or seeds.

The invention also discloses an apparatus for the protection of useful plants and/or seeds against undesired weed by means of the device (marking aid), the apparatus comprising at least the following components:

a mechanism adapted for applying a reusable ribbon or rope-shaped structure, to which a plurality of annular elements are attached in spaced-apart relationship, to a cultivated surface, each element enclosing the location of a plant or seed, and/or adapted for removing the ribbon or rope-shaped structure from the cultivated surface after harvesting of the crop plants.

Preferably the apparatus has a spool for winding the device (marking aid).

In addition, the apparatus may also have a mechanism designed to provide one plant or seed with a root ball at a time and to apply it to one of the annular elements, in particular by means of a fixing element arranged below the detectable means and inserted into the root ball. Thus the apparatus is extended to a complete planting and/or sowing machine.

Finally, the invention also discloses a machine for the protection of useful plants and/or sown seed against unwanted weeds by means of the device (marking aid), the machine being designed for mechanical weed control and having the following components:

a unit for detecting each element in order to mark the respective location (useful plant zone) for detection by machine to process the mechanical weed control;

a mechanism for mechanically removing weeds outside the marked locations of the plants or seeds.

This makes the machine suitable for safe and fully autonomous mechanical weed control.

Preferably, the machine is also equipped with a sensor system for detecting the seedlings and/or crops outside the planting area, i.e. crops which do not belong to the planting area in question.

The invention thus comprises the following aspects in particular:

(i) A device for delimitation/boundary of zones of useful plants, i.e. a device which can be understood as a marking aid.

(ii) A method which, with the aid of this device, provides autonomous weed control.

(iii) An apparatus for applying and reapplying the boundaries of crop zones on agricultural land (iv) An autonomous weed control machine, where the machine is equipped with: (a) a detector for recognizing crop zones on the basis of the delimitation information provided by the crop zone delimitation device, optionally with (b) a sensor system for recognizing unwanted plants outside the crop zones and with (c) a mechanical device for weed control outside the crop zones at ground level.

BRIEF DESCRIPTION OF DRAWINGS

In the following, the invention is described in detail on the basis of embodiments, with reference to the enclosed figures/drawings, which show the following schematic diagrams.

DETAILED DESCRIPTION

Figure 1:
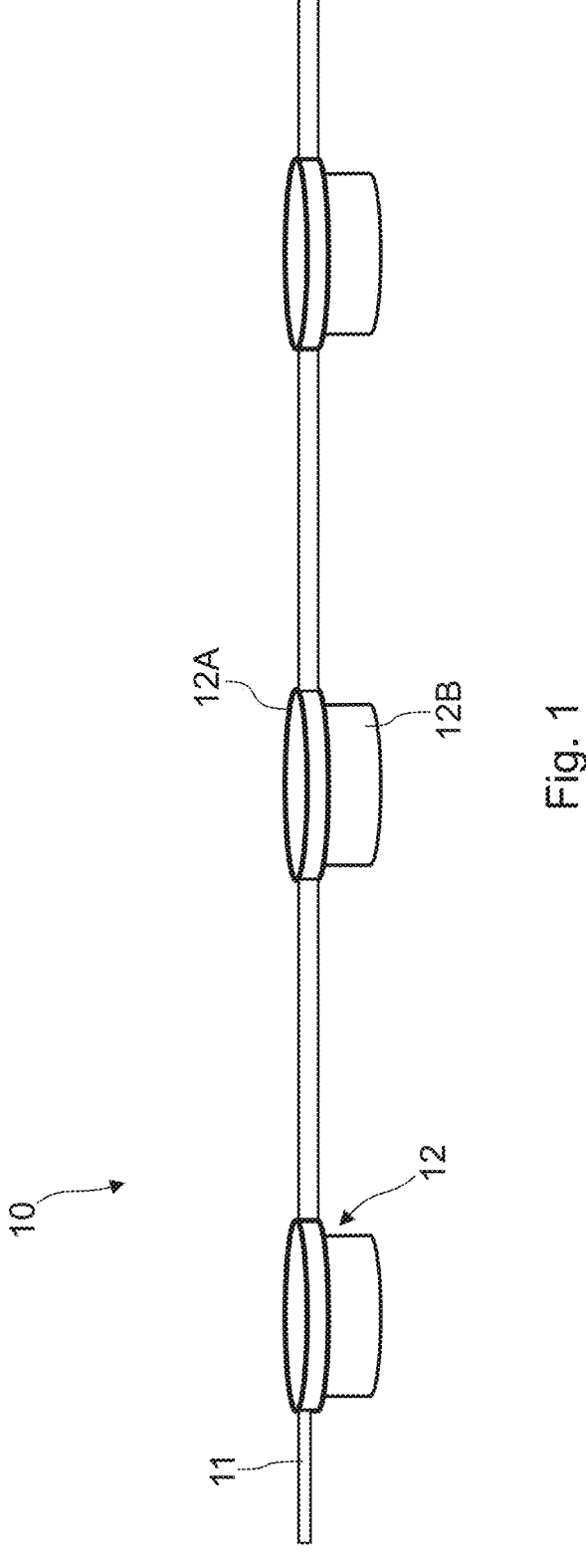
FIG. 1 shows the design of the device (marking aid) for protecting useful plants and/or seeds against weeds.
Figure 2:
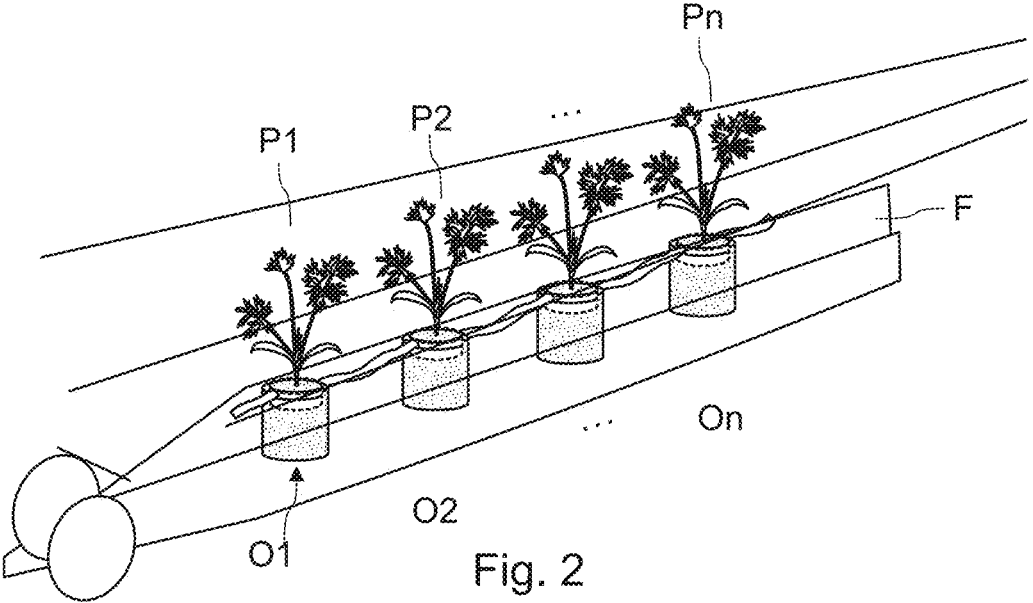
FIG. 2 illustrates the application of the device (marking aid) on a cultivated surface.
Figure 3:
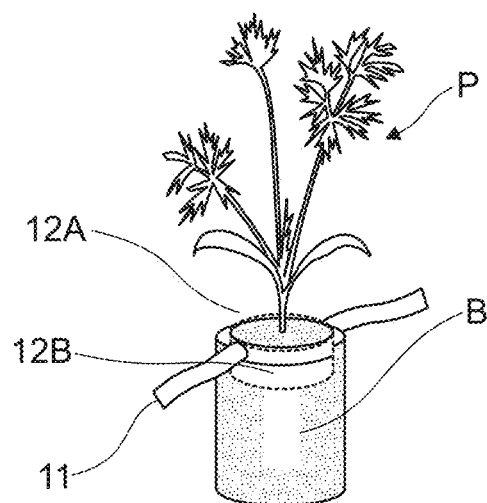
FIG. 3 shows the structure of a plant (seedling) prepared for planting with soil ball to which the device (marking aid) is fixed.

First, reference is made to FIGS. 1-3 to describe a first preferred embodiment of the invention:

As shown in FIG. 1, the device 10 is composed of a ribbon or rope-shaped structure 11 and annular elements 12 attached thereto, the elements being spaced apart from each other to suit the desired distance between the seedlings to be planted (cf. FIG. 2). Each annular element 12 encloses one of the seedlings (young plants) and contains in the upper annular area a detectable means 12A, such as a metallic ring, which can be detected by means of an inductive method. In the lower area, each element 12 has a fixing element 12B, which here, for example, is formed as a tubular section that can be embedded in a ball of soil (root ball of the seedling) so that the seedlings are connected to the device (see FIG. 3). Thus each crop plant P (seedling) is located with its roots in a root ball B, to which a annular element with detectable means 12A and fixing element 12B is attached. The ribbon or rope-shaped structure 11 is preferably of an elastic design and is adapted for being wound on a spool or reel and for being unwound from it. This will be described later with reference to FIG. 7.

As illustrated in FIG. 2, the entire device 10 is applied to a cultivated surface F, e.g. by placing the ribbon or rope-shaped structure 11 together with the seedlings P1, P2 . . . Pn being fixed to it into a setting furrow and then closing the furrow so that the device 10 is still placed above the topsoil as a marking aid.

By arranging the device 10 according to the invention as shown in FIG. 2, the locations O1, O2, . . . On (crop zones) of the crop plants P1, P2, . . . Pn are marked/indicated in a clearly detectably manner. The device thus ensures a reliable detectable delimitation or boundary of the crop zones.

To apply the device 10, an apparatus 20 is disclosed (see also FIG. 7), which contains in particular a mechanism designed for this purpose, that will be described in detail later. Furthermore, for the weed control a machine 30 is disclosed (see also FIG. 8), which contains in particular a unit for detecting the elements and a mechanism for the mechanical removal of seedlings, which will also be described in detail later.

Figure 4:
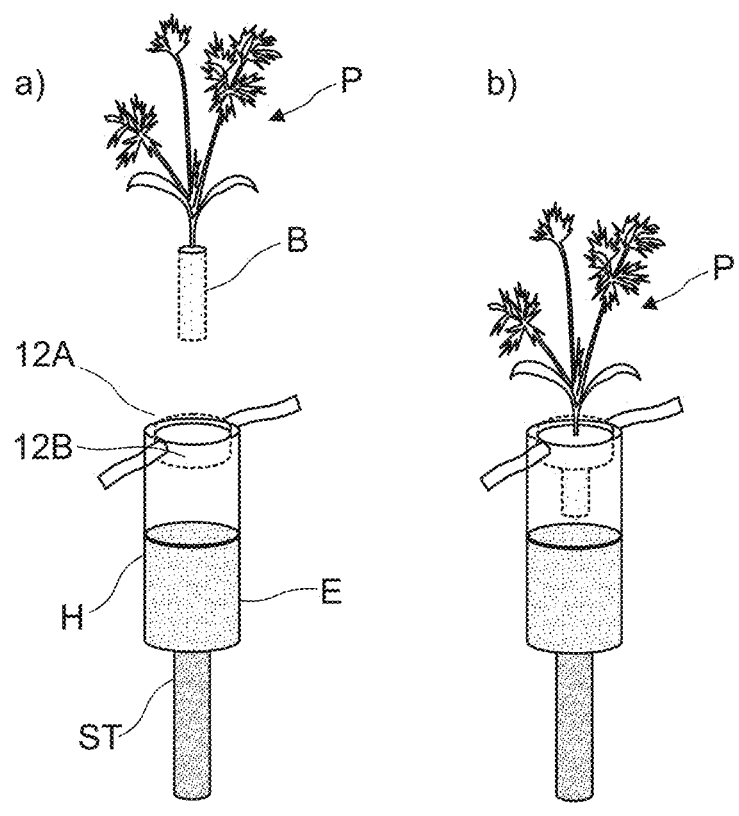
FIG. 4a-d) illustrate the stepwise preparation of the seedling.
Figure 4:
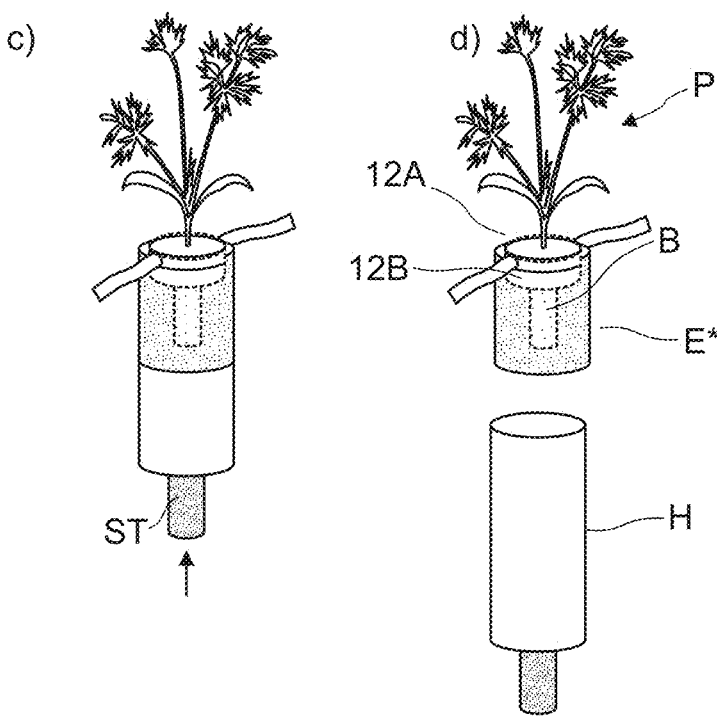
Figure 5:
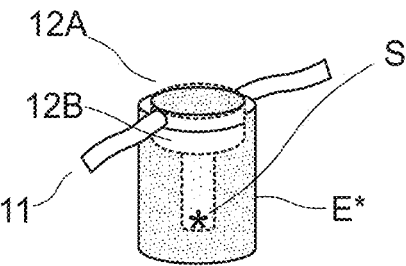
FIG. 5 shows the structure of a sown seed (seedling) prepared for planting with soil ball to which the device (marking aid) is fixed.
Figure 6:
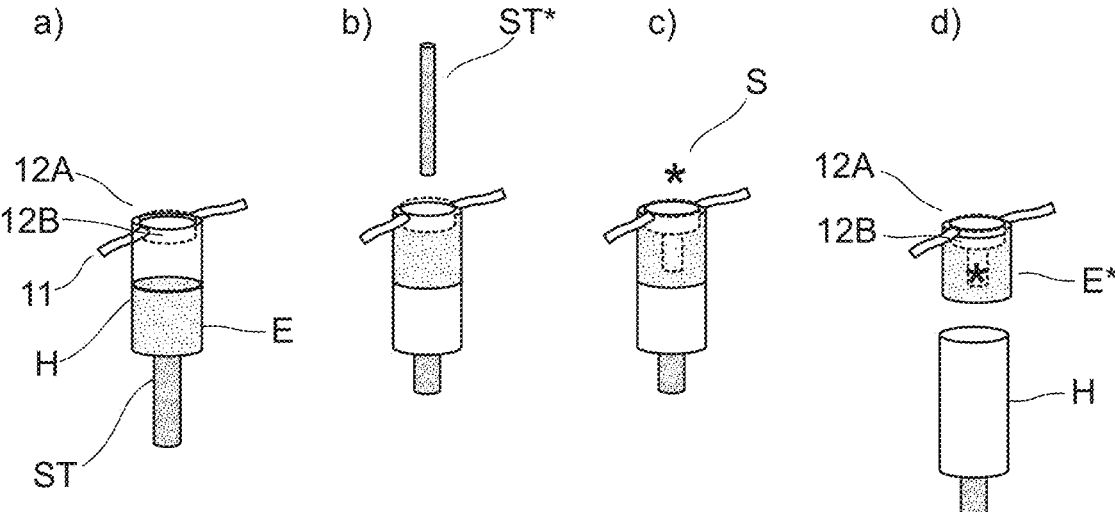
FIG. 6a-d) illustrate the stepwise preparation of the seedlings.

First, with reference to FIGS. 4 to 6, we describe the preparation of plants (seedlings) or sown seed (seeds) for deploying them on the field in that they are attached to the device 10, in particular by fixing them to the ribbon or rope-shaped structure 11.

The FIGS. 4a-d illustrate the step-by-step method for the preparation or prearrangement of a seedling P. As FIG. 4a shows, the seedling P is inserted with its roots or root ball B into a sleeve H containing soil E or humus. At the upper end of the sleeve Fl is one of the annular elements 12 with its detectable means 12A and the fixing element 12B. The root ball of the seedling P is inserted through the annular element (FIG. 4b) and then the soil E is pressed together with the ball B from below; for this purpose a plunger of punch ST presses the soil E upwards (FIG. 4c), whereby the fixing element 12B penetrates into the pressed soil E and thus a connection/fixation with the seedling P is established. Finally, the pressed soil ball E* together with the seedling P is pulled out of the sleeve Fl, so that the sleeve H is free for the preparation of the subsequent seedling. In this way, each seedling P can be connected to the device 10 (marking aid) (see also FIGS. 7 and 8), whereby the seedlings P1, P2, . . . . . Pn can then be applied one after the other and at the desired distance in the field.

Figure 7:
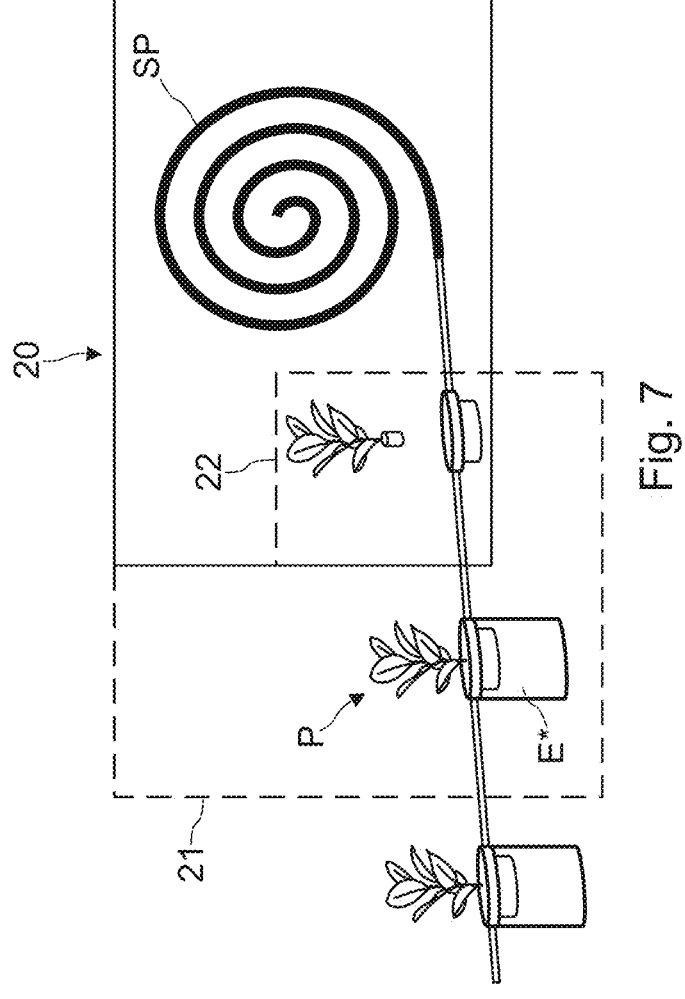
FIG. 7 shows the construction of an apparatus for applying the device (marking aid) on a cultivated surface and optionally to remove the device again.

The described preparation of the seedlings is carried out by apparatus 20, and also the subsequent placing of the ribbon of seedlings (see FIG. 7).

For the preparation of the seedlings (see FIG. 4a-d) or the seeds (see FIG. 6a-d) the device has a mechanism 22 which is designed to provide a plant P or a seed S with a root or soil ball B and to affix one of the annular elements 12, in particular by means of the fixing element 12B which is arranged below the detectable means 12A and is inserted into the root ball B.

For placing the crop plants or sown seeds, the apparatus 20 comprises another mechanism 21 designed to apply the device 10 together with the seedlings P or the seeds on the cultivated surface F, in particular along a planting furrow (see FIGS. 2 and 7), so that each annular element 12 represents/indicates the respective planting location O1, O2, . . . On as a detectable boundary.

For this purpose, the apparatus 20 particularly has a spool SP from which the device 10 with its ribbon or rope-shaped structure 11 can be unwound.

After applying the plants P, with the help of the detectable annular elements 12 weeds can then be removed autonomously by a machine 30 (see FIG. 8) purely mechanically without the use of chemical spraying agents. The detectable elements 12 can also be helpful for an automatic harvesting of the plants.

After harvesting the plants P, the apparatus 20 is used again and removes the device 10 from the cultivated surface F. The ribbon or rope-shaped structure 11 is then rewound onto the spool body SP (see FIG. 7) and can thus be stored compactly as a wound up marking aid until it is reused.

The same method for preparing and applying the marking aid can also be used for sown seeds, wherein instead of a seedling one seed S per soil ball E* is now used (see FIGS. 5 and 6a-d). In order to embed the respective seed S in the conical soil ball correctly, a small stamp or plunger ST* is used, which presses a hole/depression for the seed S into the conical soil ball. This method is also carried out by the apparatus 20 (FIG. 7). It should be noted that the soil ball E* need not be strictly speaking conical in shape, but can take any practical form that a sown seed machine and its integrated apparatus can work efficiently with.

After planting or sown seed, the growth phase begins. As soon as weeds have formed around the crop plants, the machine 30 (see FIG. 8) is used for mechanical control of unwanted plants (weeds). As already mentioned, the applied device or marking aid 10 with the detectable means 12A allows a reliable detection of the respective crop zones.

For this purpose the machine 30 contains a unit 31 designed to detect each annular element 12 for indicating or marking the respective planting location O1, O2, . . . On for detection by machine to manage the mechanical weed control. 'For marking' is meant here that the machine, within the framework of the autonomously running control program, recognizes the respective planting location as a protection zone of the plant by means of the detection and only releases the areas outside of it for mechanical removal of weeds. The actual planting zones remain protected from mechanical intervention. The machine 30 has a mechanism 32 controlled by a control program for mechanical removal of unwanted plants outside the respective protection zones.

Figure 8:
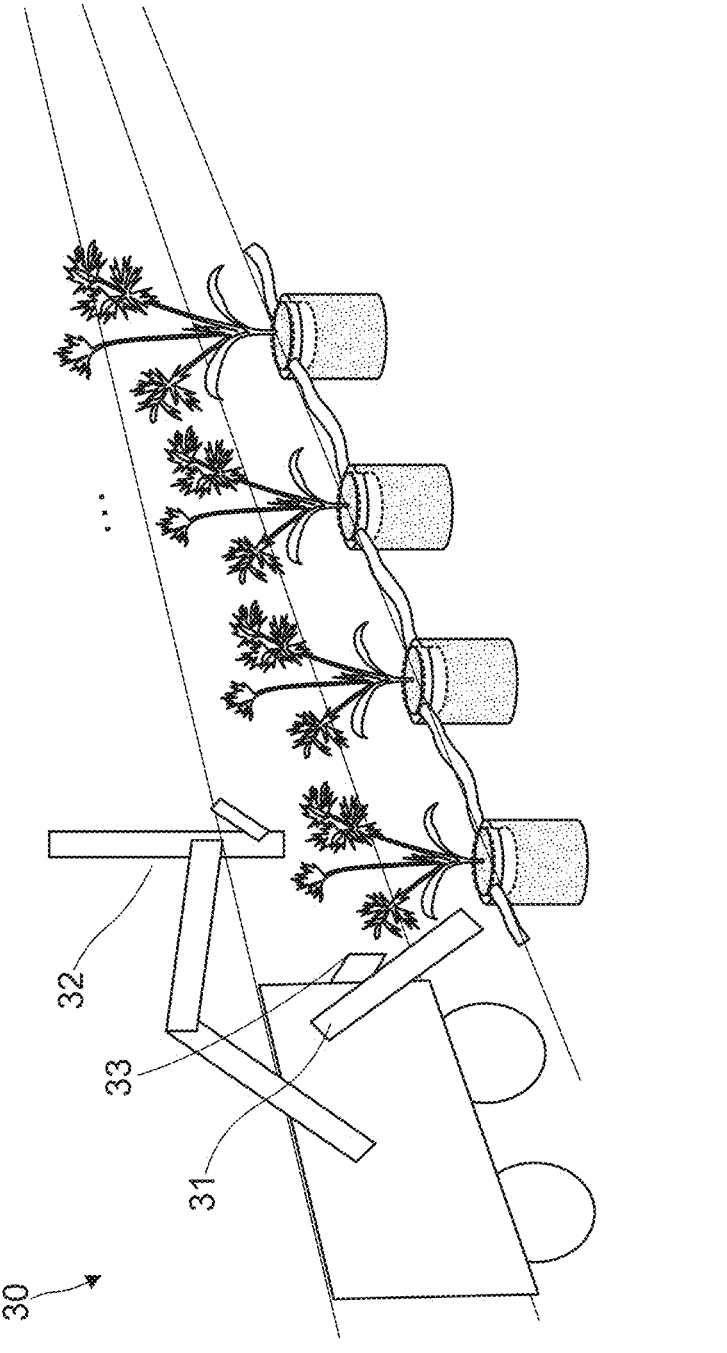
FIG. 8 shows an autonomously operable machine for mechanical weed control using the device (marking aid)
Figure 9:
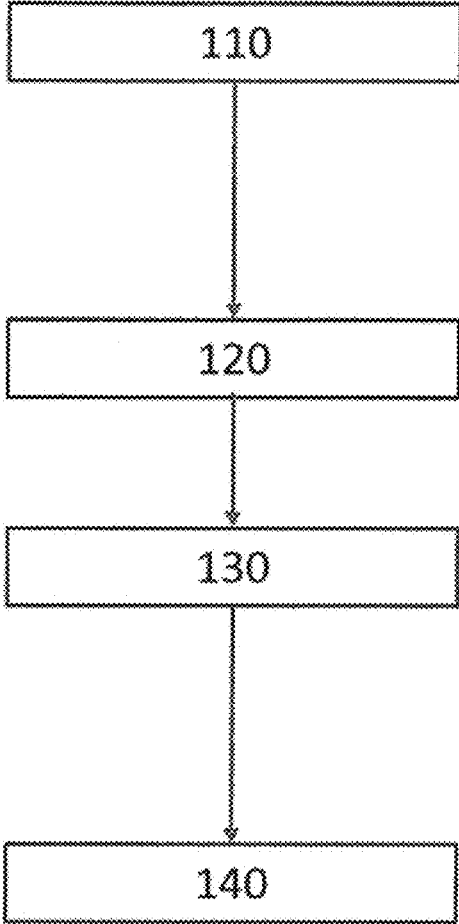
FIG. 9 shows a flow chart for a method of mechanical weed control by means of the device (marking aid)

The working methods of the in FIG. 7 schematically illustrated apparatus 20 and the in FIG. 8 schematically illustrated machine 30 are described in more detail in the following with the help of the flow chart shown in FIG. 9, which refers to the step sequence of the method 100 according to invention for the protection of useful plants and/or sown seed against unwanted seedlings.

In a first step 110 the marking aid or protection device 10 with its ribbon or rope-shaped structure 11, on which the annular elements 12 are attached at a distance from each other, is applied to the cultivated surface F with the aid of the apparatus 20. Thus each element 12 encloses the location O of the respective plant P or the sown seed S (see also FIG. 2).

Within the scope of this step 110 the protection device 10 is prepared before it is applied. For this purpose the apparatus 20 provides one plant P or seed with a root ball B and applies the annular element 12 to it. This is done by means of the fixing element 12B, which is arranged below the detectable means 12A and is inserted into the root ball B. In this way the protection device 10 is equipped with the plants (seedlings) P and everything can then be applied by means of a rope-shaped composition (see also FIG. 7).

The machine 30 (see also FIG. 8) carries out in a step 120 the autonomous detection of each element 12 to determine the respective location O1, O2, . . . On for a detection by machine to manage the mechanical weed control.

In this way the machine 30 can then be used in a step 130 to carry out a safe mechanical removal of unwanted plants outside the marked planting locations O1, O2, . . . On.

After harvesting the crop plants P, the apparatus 20 removes the respective protection device 10 from the cultivated surface F in a step 140, the device can be stored, in particular in the form of a wound coil, for reuse in a later new planting or sowing, in particular in the form of a wound coil.

In summary, a method and devices are disclosed here which enable autonomous, safe and purely mechanical control of unwanted plant or weeds. The present invention meets the growing worldwide demand of significantly reducing the amount of herbicides used in agriculture. The method for autonomous mechanical weed control described here makes it possible to dispense with herbicides completely. The invention comprises in particular the components described above:

Device 10 for delimitation of crop zones

Apparatus 20 for the application and reinsertion of the Delimitation devices 10 of crop zones in the cultivated surface F Autonomously operating machine 30 having (i) a detector/unit 31 for detecting crop zones on the basis of the delimitation information provided by the device 10 for delimiting crop zones, having (ii) a sensor system 33/an additional detector for recognizing plants outside the crop zones at ground level and having (iii) a mechanical device/mechanism 32 for controlling plants outside the crop zones at ground level.

The following is supplemented or explained in more detail here with regard to the function and mode of operations of the components:

a) as to the Device 10 (in Brief Also Referred to as Protection Device or Delimitation Device):

As has been described above, in particular on the basis of FIGS. 1-6, the device 10 for limiting crop zones has several annular elements 12 which act as a detectable enclosure and has a ribbon-shaped structure 11 which can be understood as a carrier for the detectable elements 12A which serve as resonance objects or inductors which in turn can be detected and identified by the detector 31 of the autonomously operating machine 30 (e.g. by means of electromagnetic induction).

In the case of seedlings P, the roots of the seedling are already pronounced and the root ball B is embedded for mechanical setting in a ball E* made of soil obtained when ploughing the setting furrow, as a carrier for fixing the delimitation device 10.

The fixing or fixation element 12B used for this purpose enables the fixing of the delimitation device 10 on the cultivated surface and, when using the method with seeds, also for fixing the crops in the crop zones.

For the later (after harvesting, as desired) recovery of the spread delimitation devices 10 or its elements 12, these are connected to each other via the respective ribbon-shaped structure 11 (also called delimitation device carrier). When processing seed, instead of the seedling the seed S is placed in the soil ball E*.

If possible, the soil ball E* should be formed from soil which is extracted on site when ploughing the seed furrow.

Figure 10:
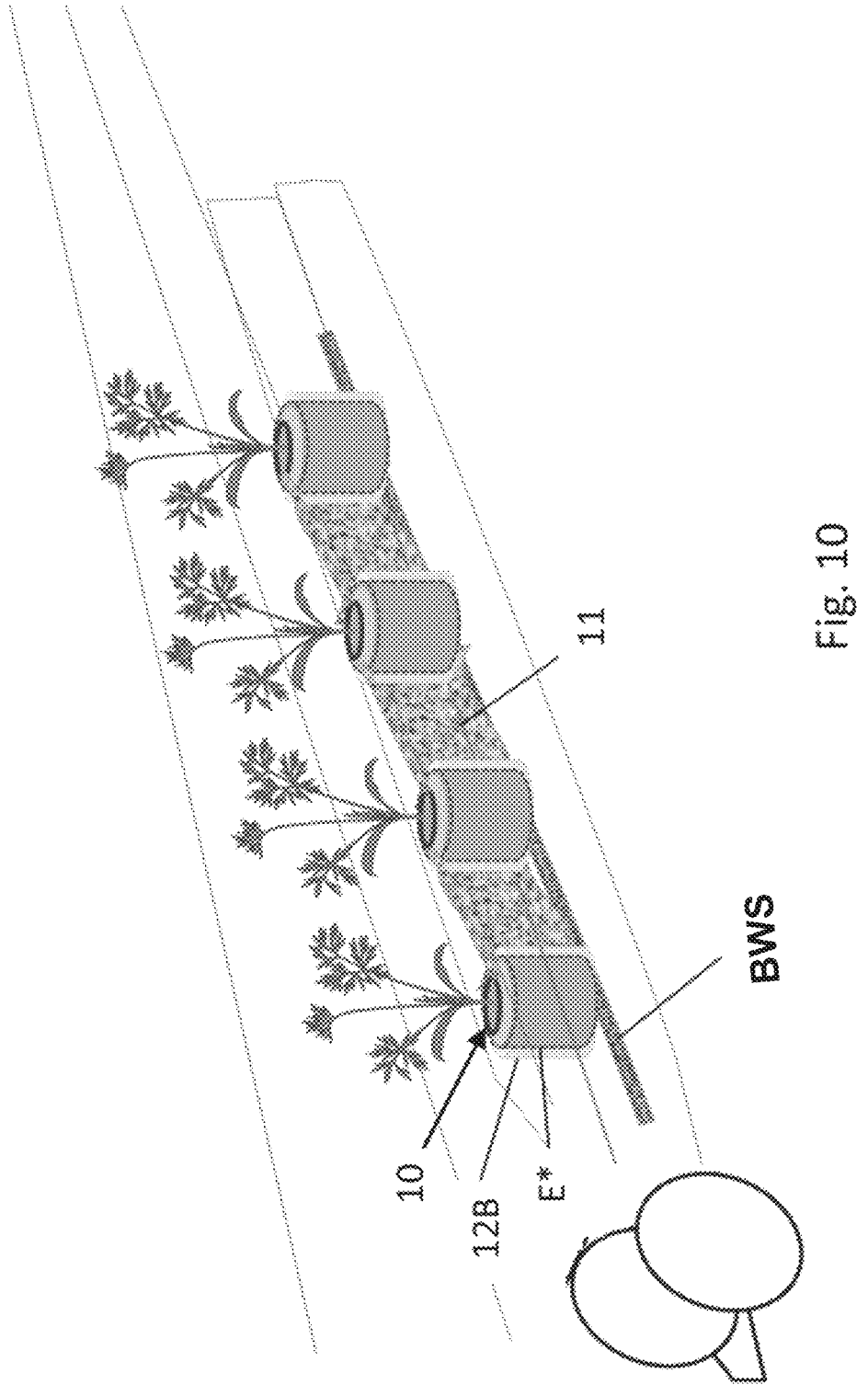
FIG. 10 shows a further embodiment of the invention.

However, if the soil quality is not good enough, the soil ball E* cannot be taken from the furrow either, but can be formed from better quality soil. If it is necessary to additionally irrigate or fertilize the plants during the cycle or if the soil ball is to be reused after harvesting, the fixation 12B can be extended to a preferably water and nutrient permeable sleeve (compare H in FIG. 4) and the carrier ribbon 11 can be inserted into the soil together with a fertilizer and/or irrigation system BWS fixed to the carrier ribbon and/or fixation 12B, which may be, for example, a nutrient-poor and/or water-poor soil or desert soil. This is illustrated in FIG. 10. When the delimitation device 10 is reinserted, the fixing 12B, the carrier ribbon 11, the fertilizer or irrigation system BWS as well as the soil ball E* can then also be recovered, reprocessed and reused for the next cycle.

With regard to the embodiment shown in FIG. 10 and the combination(s) of technical features implemented therein, we point out that the following combination of features also represents an invention in itself, which can be pursued separately, e.g. within the framework of a divisional application and/or an independent application claiming priority(s):

Accordingly, it is a device 10 for the protection of useful plants P and/or seeds S against undesired plants or weeds, the device comprises the following features:

a reusable ribbon or rope-shaped structure 11, on which a plurality of soil balls E* (e.g. optionally also without sown seed or plants) are attached at a distance from one another, wherein the structure 11 is designed to be applied to an agricultural (in particular nutrient-poor and/or water-poor) area F so that each soil ball E*for at least one of a useful plant P or the sown seed thereof S forms a local (optimized) nutrient medium planting site ("small earth sack"), where the structure 11 can be removed from the area after the plants have been harvested and the (replantless) soil balls E* can be prepared by treating the soil therein with nutrients and/or water for (subsequent) replant/seeding on the same or a similar (nutrient-poor and/or water-poor) area. Optionally at least some of the soil cones E* and/or the structure 11 itself can be equipped with detectable means (see e.g. metal rings 12A in FIG. 3 as well as FIG. 2) to mark the respective location (O1, O2, . . . On) for a detection by machine to control a mechanical seedling control. A fertilization and/or irrigation system BWS (see FIG. 10) can also be optionally attached to structure 11 (integral if necessary) to supply the soil cones E*("soil bags") with water and, if necessary, other nutrients even during the growth phase of the plants.

b) as to the Use of the Apparatus 20:

The apparatus 20 (see especially FIGS. 2 and 7) is mainly used for the application and reuse of the protection devices 10 for delimitation of the crop zones on the cultivated surface F. The apparatus can also be integrated in seed drills and planters.

Seed drills and planters are generally used in commercial agriculture. When using planters, crops are directly applied to the agricultural land and when using seeders the seed of the crops is sown on the agricultural land. The method according to the invention is suitable for planting useful plants as well as for applying single sown seed. In planting machines, the seedlings P are placed directly into the delimitation devices 10 on the delimitation device carrier 11 and the fixing 12B. The root ball B is then covered with soil E by a stamp or ram ST with sleeve H (see FIG. 4a-d) and placed by the seed drill as soil ball E*in the seed furrow so that the transition from the root ball to the stem of the respective seedling P is at the level of the surrounding soil and then the seed furrow is closed again.

By the described method, the elements 12A of the delimitation devices 10, which are especially designed as inductors, are applied directly to the soil surface. When the settling furrow is closed by the setting or planting machine with the apparatus 20, the inductors 12A of the delimitation devices thus remain stabilized on the soil surface by the delimitation device carrier 11. The respective delimitation device 10 is unrolled from a supply reel or spool SP by the setting machine or apparatus 20 with the aid of the ribbon-shaped carrier 11.

When using a single seed drill the seed S itself must be placed in the soil. This is usually also done by a seed furrow into which the seed is applied and which is then closed again by the single seed drill. To ensure that the inductors 12A of the delimitation device 10 are applied to the soil surface and that the crop plants P from the seed germinate also within the crop zones, it is necessary to fix the delimitation devices 10 on the soil surface and the seedlings within the delimitation devices 10.

This is done via the soil ball E*. The planting machine or apparatus 20 first creates the soil ball E* in the sleeve H and connects it to the delimitation device 10 by pressing the soil against the fixing element 12B of the delimitation device 10 with the plunger ST. Then a seed hole is pierced with a small rod-shaped punch ST* and the seed S is dropped into the seed hole. Then the soil ball E* together with the delimitation device 10 and the seed is inserted into the seed furrow and the furrow is then closed (see FIG. 6a-d).

When the seed furrow is closed by the seed drill, the inductors 12A of the delimitation devices 10 remain stabilized and fixed to the soil surface by the delimitation device carrier 11. Due to the sleeve shape of the fixing device 12B and the seed hole, the seedlings of the seed remain within the crop zones after germination.

After harvesting, the limiters 10 can be easily recovered by rolling the limiter carrier 11 onto a spool SP and reusing it in the next cycle. For use with different crops, the diameter of the delimitation, the type or shape of the fixation 12B and the distances between the annular elements 12 on the delimitation carrier 11 are varied.

In order to be able to process larger quantities within a short period of time when removing and replacing the delimitation device carriers 10, the arrangement of several delimitation device carriers 11 can lead to optimization (e.g. by parallel attachment to a transverse axis).

(c) as to the Autonomous Machine for Controlling the Seedlings:

One of the biggest problems in the weed clearance is to achieve a reliable and as far as possible error-free differentiation between useful and unwanted plant. Instead of training conventional machines to make a selection based on specific characteristics of the crop plants, the method presented makes it possible to select the crop plants reliably from the weed without specific information about the respective crop plants. For this purpose the detector 31 of the autonomous machine 30 (see also FIG. 8) recognizes the respective crop zones O1, O2, . . . On, which are enclosed by the inductors 12A of the delimitation device 10 and marked in a clearly detectable way. The weeds and seedlings located outside the crop zones are then combated with a mechanical device.

Preferably, after the crop plant zones have been identified, all seedlings are marked within the control program with the aid of a sensor system 33, which may contain an optical sensor, for example, and are then combated with the mechanical device 32, e.g. by pressing them into the ground with a stamp and/or cutting them off with a chisel.

The invention disclosed here enables a safe, automatic mechanical weed clearance without the use of herbicides or the like, whereby the protection devices can be reused several times, thus making the invention particularly environmentally friendly and sustainable.

LIST OF REFERENCE SIGNS

10 device—auxiliary means for delimitation/boundary
11 ribbon-shaped structure
12 annular elements
12A detectable means
12B fixing element
P crop plants P1 . . . Pn
B root ball
E soil
E* soil ball, tapered
S sown seeds/seeds
F cultivated surface with setting furrow(s)
O location(s) or place(s) of planting O1 . . . On
H sleeve
ST stamp or plunger
ST* stamp or plunger
20 apparatus
21 mechanism for applying the device 10
22 mechanism for applying the plants to the device 10
SP spool
30 Machine for controlling/managing weed control
31 detection unit
32 mechanism for mechanical removal of weed
33 sensor(s)
100 methods with steps:
110 applying the device 10
120 detecting the elements 12
130 mechanically removing weed
140 removing the device 10 for reuse

The invention claimed is:

1. A method (100) for protecting crop plants (P) and/or sown seeds (S) against unwanted seedlings by means of a device (10) for protecting crop plants (P) and/or sown seeds (S) against unwanted plants or weeds, wherein the device comprises:

a reusable, ribbon- or rope-shaped structure (11) to which a plurality of annular elements (12) are attached and spaced apart from one another, wherein the reusable, ribbon- or rope-shaped structure (11) has a width narrower than each annular element and is applied to a cultivated surface (F) se such that each annular element (12) encloses the location (O) of a useful plant (P) or its sown seeds (S) to mark and indicate a respective location (O1, O2, . . . On) as an annular protection and crop zone, and wherein each annular element (12) has a detectable metallic or magnetic material (12A) to mark or indicate the respective location (O1, O2, . . . On) for detection by a machine to manage mechanical weed removal outside each annular protection and crop zone, wherein the method (100) comprises the following steps:

applying (110) to the cultivated surface (F) the reusable ribbon- or rope-shaped structure (11) to which the plurality of annular elements (12) are attached spaced apart from one another, each annular element (12) enclosing the location (O) of the crop plant (P) or the sown seeds (S) as the annular protection and crop zone;

detecting (120) each annular element (12) having said detectable metallic or magnetic material (12A) to mark or indicate the respective location (O1, O2, . . . On) for detection by machine to manage mechanical weed removal;

mechanically removing (130) by said machine unwanted plants or weeds outside the marked or indicated locations (O1, O2, . . . On) of the plants (P1, P2, . . . Pn) or the sown seeds (S).

2. The method according to claim 1, wherein the detectable metallic or magnetic material is configured for inductive and/or magnetic detection.

3. The method according to claim 1, wherein below each of the detectable metallic or magnetic material (12A) at least one fixing element (12B) is arranged to be inserted into a root ball (B) of the respective plant (P) or into a soil ball (E, E*) surrounding the sown seed(S).

4. The method according to claim 1, wherein said ribbon- or rope-shaped structure (11) is elastic and adapted to be wound on and unwound from a spool (SP).

5. The method according to claim 1, wherein the device (10) is equipped with a fertilization and/or irrigation system (BWS) which, together with the ribbon- or rope-shaped structure (11), is configured to be brought, together with the ribbon- or rope-shaped structure (11), into the soil.

6. The method according to claim 1, wherein a root ball (B) of the plant (P) or a soil ball (E, E*) surrounding the sown seeds (S) is placed in a water- and/or nutrient-permeable sleeve (H) which can be introduced into the soil.

7. The method according to claim 6, wherein the root ball (B) of the plant (P) or the soil ball (E, E*) surrounding the sown seeds (S) is placed in the water- and/or nutrient-permeable sleeve (H), and which is introduced into the soil together with a fertilization and/or irrigation systems (BWS).

8. The method (100) according to claim 1, wherein after harvesting the crop plants (P), the device (10) is removed (140) from the cultivated surface (F) for reuse for subsequent new plantings or sowing of seeds.

9. The method (100) according to claim 1, wherein before the step (110) for applying the ribbon- or rope-shaped structure (11), the method further comprises attaching a plant (P) being provided with a root ball (B) or seeds (S) surrounded by a soil ball (E, E') to one of the annular elements (12).

10. The method (100) according to claim 9, wherein before the step (110) for applying the ribbon- or rope-shaped structure (11), attaching the plant (P) being provided with the root ball (B) or the seeds (S) surrounded by the soil ball (E, E') to one of the annular elements (12) by means of a fixing element (12B) which is arranged below the detectable metallic or magnetic material (12A) and is inserted into the root ball (B).

11. The method (100) according to claim 1, characterized in that the ribbon- or rope-shaped structure (11) is disposed on the cultivated surface (F) together with the attached plants (P) or the seeds (S).

* * * * *